(12) United States Patent
Kim et al.

(10) Patent No.: US 11,036,452 B2
(45) Date of Patent: Jun. 15, 2021

(54) DISPLAY CONTROL SYSTEM

(71) Applicant: SAMSUNG DISPLAY CO., LTD., Yongin-si (KR)

(72) Inventors: Mugyeom Kim, Yongin-si (KR); Minsoo Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 202 days.

(21) Appl. No.: 15/225,854

(22) Filed: Aug. 2, 2016

(65) Prior Publication Data

US 2017/0147270 A1 May 25, 2017

(30) Foreign Application Priority Data

Nov. 24, 2015 (KR) .................. 10-2015-0164834

(51) Int. Cl.
*G06F 3/14* (2006.01)
*G09G 5/14* (2006.01)
(Continued)

(52) U.S. Cl.
CPC .............. *G06F 3/1423* (2013.01); *B60R 1/00* (2013.01); *B60R 1/04* (2013.01); *B60R 11/02* (2013.01);
(Continued)

(58) Field of Classification Search
CPC . H04L 67/12; H04L 63/0227; H04L 63/1416; H04L 63/1425; H04L 63/14; H04L 63/1408; H04L 63/1441; H04L 67/10; H04L 12/28; H04L 12/2816; H04L 12/282; H04L 1/08; H04L 2012/40208; H04L 2012/40215; H04W 48/04; H04W 4/046; H04W 8/22; H04W 4/02; H04W 4/027; H04W 4/023; H04W 4/026; H04W 4/16; H04W 76/00; H04W 76/027; H04W 76/18; B60H 1/00657; B60H 1/00428; B60H 1/00735; B60L 2240/622; B60L 2240/70; B60L 2240/80; B60L 50/52; B60L 53/14; B60L 53/305; B60L 1/003; B60L 2210/30; B60L 2240/34; B60L 2250/12; B60L 2250/14; B60L 2250/16; B60L 2260/52; B60L 2260/54; G01C 21/26;
(Continued)

(56) References Cited

U.S. PATENT DOCUMENTS

| 7,394,405 B2 * | 7/2008 | Godden ................... G08G 3/02 340/988 |
| 7,932,819 B2 | 4/2011 | Arie et al. |

(Continued)

FOREIGN PATENT DOCUMENTS

| CN | 101253067 | 8/2008 |
| CN | 104859648 | 8/2015 |

(Continued)

*Primary Examiner* — Paulos M Natnael
(74) *Attorney, Agent, or Firm* — Kile Park Reed & Houtteman PLLC

(57) ABSTRACT

A display control system includes a coupling display unit coupled to a mobile device in a vehicle. The coupling display unit includes a disposition region which includes the mobile device and a display to receive information from the mobile device and to display an information region corresponding to the mobile device.

20 Claims, 16 Drawing Sheets

(51) Int. Cl.

| | | |
|---|---|---|
| *B60R 1/04* | (2006.01) | |
| *G09G 5/00* | (2006.01) | |
| *G06K 9/00* | (2006.01) | |
| *H04N 7/18* | (2006.01) | |
| *G09G 5/12* | (2006.01) | |
| *G06F 1/16* | (2006.01) | |
| *B60R 1/00* | (2006.01) | |
| *B60R 11/02* | (2006.01) | |
| *B60R 11/00* | (2006.01) | |

(52) U.S. Cl.
CPC ....... *G06F 1/1632* (2013.01); *G06K 9/00791* (2013.01); *G09G 5/006* (2013.01); *G09G 5/12* (2013.01); *G09G 5/14* (2013.01); *H04N 7/185* (2013.01); *B60R 2011/0005* (2013.01); *B60R 2011/0007* (2013.01); *B60R 2011/0033* (2013.01); *B60R 2011/0075* (2013.01); *B60R 2300/804* (2013.01); *B60R 2300/8026* (2013.01); *G09G 2370/06* (2013.01); *G09G 2380/10* (2013.01)

(58) Field of Classification Search
CPC ...... G01C 21/367; G01C 21/20; G01C 21/30; G01C 21/32; G01C 21/36; G01C 21/3608; G01C 21/3688; G01C 21/28; G01C 21/3638; G01C 21/3667; G01C 22/00; G01C 21/12
See application file for complete search history.

(56) References Cited

U.S. PATENT DOCUMENTS

| | | | |
|---|---|---|---|
| 8,177,182 B1 | 5/2012 | Wood et al. | |
| 8,229,162 B2* | 7/2012 | Miyamoto | G06K 9/2036 382/103 |
| 9,186,994 B2* | 11/2015 | Okuyama | G06F 3/0482 |
| 9,199,553 B2 | 12/2015 | Cuddihy et al. | |
| 9,218,057 B2* | 12/2015 | Aoki | G06F 3/013 |
| 9,338,605 B2* | 5/2016 | Guba | H04W 4/027 |
| 9,398,421 B2* | 7/2016 | Guba | H04W 4/027 |
| 9,513,702 B2* | 12/2016 | Cho | G06F 3/013 |
| 9,536,197 B1* | 1/2017 | Penilla | B60L 58/12 |
| 9,601,017 B2* | 3/2017 | Yamashiro | G09B 29/10 |
| 9,604,542 B2* | 3/2017 | Michaelis | B60K 37/06 |
| 9,872,225 B2* | 1/2018 | Guba | H04W 4/027 |
| 10,217,160 B2* | 2/2019 | Penilla | B60S 5/06 |
| 10,390,748 B2* | 8/2019 | Lee | A61B 5/7282 |
| 2001/0029425 A1* | 10/2001 | Myr | G01C 21/3492 701/117 |
| 2004/0225425 A1* | 11/2004 | Kindo | G08G 1/0969 701/36 |
| 2006/0273930 A1* | 12/2006 | Godden | G08G 3/02 340/988 |
| 2008/0117079 A1* | 5/2008 | Hassan | B60R 25/045 340/901 |
| 2008/0278822 A1 | 11/2008 | Choi et al. | |
| 2009/0079591 A1* | 3/2009 | Motoyama | G08G 1/205 340/991 |
| 2010/0117810 A1* | 5/2010 | Hagiwara | G06F 3/0483 340/425.5 |
| 2010/0254595 A1* | 10/2010 | Miyamoto | G06K 9/2036 382/159 |
| 2011/0128446 A1 | 6/2011 | Woo | |
| 2011/0267184 A1 | 11/2011 | Lee | |
| 2012/0242510 A1* | 9/2012 | Choi | G01C 21/3688 340/988 |
| 2012/0272193 A1* | 10/2012 | Michaelis | B60K 37/06 715/863 |
| 2013/0005261 A1* | 1/2013 | Yamanaka | H04L 67/12 455/41.2 |
| 2013/0050973 A1 | 2/2013 | Rohrbach | |
| 2013/0106693 A1* | 5/2013 | Okuyama | G06F 3/0482 345/157 |
| 2014/0062688 A1* | 3/2014 | Aoki | B60K 35/00 340/441 |
| 2014/0078022 A1* | 3/2014 | Dusterhoff | G06F 3/1423 345/3.1 |
| 2014/0085913 A1 | 3/2014 | Han | |
| 2014/0118222 A1* | 5/2014 | Barrett | G01C 21/3688 345/2.2 |
| 2014/0125583 A1* | 5/2014 | Aoki | B60K 37/02 345/156 |
| 2014/0270243 A1* | 9/2014 | Bennett | B60N 2/919 381/86 |
| 2014/0335902 A1* | 11/2014 | Guba | H04W 4/027 455/456.4 |
| 2014/0365120 A1 | 12/2014 | Vulcano et al. | |
| 2015/0015479 A1* | 1/2015 | Cho | G06F 3/1423 345/156 |
| 2015/0094877 A1* | 4/2015 | Tahnoose | G07C 5/008 701/1 |
| 2015/0253753 A1* | 9/2015 | Bennett | B60K 37/00 700/83 |
| 2016/0042642 A1* | 2/2016 | Yamashiro | G09B 29/10 340/990 |
| 2016/0073324 A1* | 3/2016 | Guba | H04W 4/027 455/39 |
| 2016/0320900 A1* | 11/2016 | Nabe | G06F 3/1454 |
| 2017/0078948 A1* | 3/2017 | Guba | H04W 4/027 |
| 2017/0103327 A1* | 4/2017 | Penilla | G06F 3/04842 |
| 2018/0060742 A1* | 3/2018 | Penilla | B60L 58/12 |

FOREIGN PATENT DOCUMENTS

| | | |
|---|---|---|
| KR | 10-2011-0059047 A | 6/2011 |
| KR | 10-2012-0066194 A | 6/2012 |
| KR | 10-2014-0054742 A | 5/2014 |
| KR | 10-2015-0073698 A | 7/2015 |
| WO | 2015/102069 | 7/2015 |

* cited by examiner

DISPLAY CONTROL SYSTEM

CROSS-REFERENCE TO RELATED APPLICATION

Korean Patent Application No. 10-2015-0164834, filed on Nov. 24, 2015, and entitled, "Display Control System," is incorporated by reference herein in its entirety.

BACKGROUND

1. Field

One or more embodiments relate to a display control system.

2. Description of the Related Art

Mobile devices perform many diverse functions. Examples include phone calls, text messages, multimedia applications, and camera functions. When a user of a mobile device is in a vehicle, the user usually uses the mobile device in a manner separate from any vehicle communication systems or functions. This may be an inconvenience to the user in certain circumstances.

SUMMARY

In accordance with one or more embodiments, a display control system includes a coupling display unit coupled to a mobile device in a vehicle, wherein the coupling display unit including a disposition region including the mobile device; and a display to receive information from the mobile device and to display an information region corresponding to the mobile device. The disposition region may include a communication circuit to communicate with the mobile device when the mobile device is in the disposition region.

The coupling display unit may include a controller to control the display to display information displayed by the mobile device when the mobile device is in the disposition region. The coupling display unit may includes a notification circuit to generate a preparation complete signal when the mobile device is in the disposition region and is completely prepared to transfer information from the mobile device to the coupling display unit. The notification circuit may transfer the preparation complete signal to steering wheel electronics of a vehicle, and the steering wheel electronics may generate a notification signal based on the preparation complete signal from the notification circuit.

The coupling display unit may include a control processor to receive information corresponding to an image captured by a camera of the mobile device, and the control processor may display the information from the mobile device on the display, process the information from the mobile device, or obtain new information based on the information received from the mobile device.

The control processor may include an environment recognizer to recognize a surrounding environment of a vehicle through the image captured by the camera, and an image converter to convert the image captured by the camera based on information of the environment recognizer to a conversion image. The display may include one or more display devices. The coupling display unit may be connected to at least one part in the vehicle. The coupling display unit may be disposed to correspond to a space between a driver seat and a passenger seat of the vehicle. The disposition region may include a groove for the mobile device.

The display may have a shape extending along a direction from a roof or a windshield to a bottom of the vehicle. The disposition region may be in one region of the coupling display unit spaced from the bottom of the vehicle. The coupling display unit may include a first side surface section, and a second side surface section, wherein the display is between the first and second side surface sections, and wherein the first side surface section is to connect the display to one region of a dash board of the vehicle and the second side surface section is to connect the display to one region of the dash board of the vehicle.

The coupling display unit may be adjacent to a roof or a windshield of the vehicle, and the disposition region may be toward a bottom of the vehicle. The coupling display unit may include one or more reflective surfaces to serve as a rearview mirror of the vehicle. The coupling display unit may include a front section towards a front of the vehicle and a bottom section farther away from a front of the vehicle than the front section and closer to a bottom of the vehicle, the disposition region may be in the bottom section, and the display may be in the front section.

The coupling display unit may include a plurality of disposition regions including a plurality of respective mobile devices and a plurality of displays, and when the mobile devices are in the disposition regions, the coupling display unit may receive information from each of the mobile devices and is to display information regions related to the mobile devices. The coupling display unit may include a display controller to control a size of a display region of each of the displays.

The coupling display unit may include a position information receiver to receive information related to a position of a vehicle; and a control processor to generate position-related vehicle driving information when the mobile device is in the disposition region, the position-related vehicle driving information including position information corresponding to vehicle while being driven, the control processor may generate the position-related vehicle driving information based on information regarding an image captured by a camera of the mobile device and the information received by the position information receiver, and the display may display the position-related vehicle driving information generated by the control processor.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
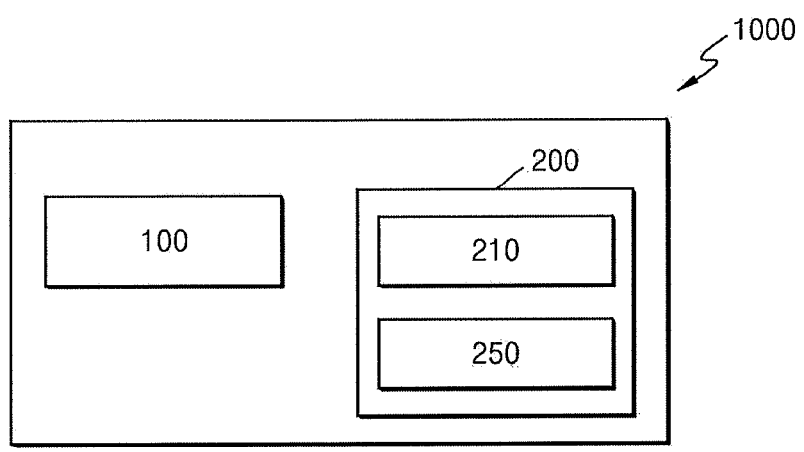
FIG. 1 illustrates an embodiment of a display control system.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of a display control system 1000 which may include a coupling display unit 200 coupled with a mobile device 100 in a vehicle. The mobile device 100 may include various electronic portable or mobile devices. Examples include a cellular phone, a personal digital assistant (PDA), and a tablet PC.

The mobile device 100 may be selectively disposed in a disposition region 210 of the coupling display unit 200, as described later. For example, the display control system 1000 may only include the coupling display unit 200 from which the mobile device 100 may be taken. For convenience of description, a case where the display control system 1000 includes the mobile device 100 and the coupling display unit 200, (e.g., a case where the mobile device 100 is not omitted and is disposed in the coupling display unit 200) will be described.

The coupling display unit 200 may include the disposition region 210 and a display unit 250. The disposition region 210 may be where the mobile device 100 is disposed. In one embodiment, when the mobile device 100 is in the disposition region 210, the disposition region 210 may include a holding member for stably holding the mobile device 100. For example, the mobile device 100 may be in the disposition region 210, where the mobile device 100 may only be separated from the disposition region 210 when a user applies force greater than a certain magnitude.

In an one embodiment, when the mobile device 100 is in the disposition region 210, the disposition region 210 may perform a communication function to communicate with the mobile device 100 and, for example, may include a contact terminal to contact and communicate with the mobile device 100. In another example, the disposition region 210 may perform a communication function that performs non-contact near distance communication with the mobile device 100.

When the mobile device 100 is in the disposition region 210, the display unit 250 may receive one or more pieces of information from the mobile device 100 in the disposition region 210, to display an information region related to the mobile device 100.

In one embodiment, the display unit 250 may display received information of the mobile device 100, for example, a received phone call and whether text message text message has been received for display.

In one embodiment, the display unit 250 may display information stored in the mobile device 100, for example, a photo or an image. In an one embodiment, when the mobile device 100 displays information, the display unit 250 may display the information displayed by the mobile device 100. Thus, the display unit 250 may be coupled with at least a display function implementation feature of the mobile device 100.

The display unit 250 may include one or more display devices that emit visible rays to display the information region. For example, the display unit 250 may include an organic light-emitting display device, a liquid crystal device, a top emission device, a plasma device, a cathode ray tube, etc. In one embodiment, the display unit 250 may receive various signals such as a user input, e.g., touch, dragging, click, etc., operations.

The display control system 1000 of the present embodiment may include the coupling display unit 200 coupled with the mobile device 100. When the mobile device 100 is in the disposition region 210 of the coupling display unit 200, the display unit 250 may retrieve one or more pieces of information from the mobile device 100 to display an information region including the one or more pieces of information.

Accordingly, the user may confirm information of the mobile device 100 using the display unit 250 of the coupling display unit 200 without having to confirm the information on the mobile device 100, thereby improving user convenience.

Figure 2:
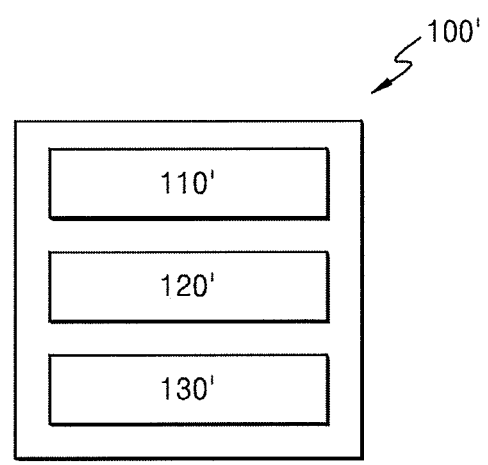
FIG. 2 illustrates an embodiment of a mobile device.

FIG. 2 illustrating an embodiment of a mobile device 100' of the display control system 1000 in FIG. 1. Referring to FIG. 2, the mobile device 100' may include a communication unit 110', a display unit 120', and a notification unit 130'. In one embodiment, the mobile device 100' may include one or more of the communication unit 110', the display unit 120', and/or the notification unit 130'.

The communication unit 110' may communicate with the coupling display unit 200. For example, the communication unit 110' may include a contact terminal and the coupling display unit 200 may include a contact terminal corresponding to the contact terminal of the communication unit 110' in the disposition region 210.

In another example, the communication unit 110' may perform a non-contact near distance communication function that may communicate with the coupling display unit 20. Examples include an NFC communication function or a Bluetooth connection function. In one embodiment, the coupling display unit 200 may include an NFC communication unit or a Bluetooth connection unit to perform the NFC communication function and/or the Bluetooth function of the communication unit 110' in the disposition region 210.

The display unit 120' may display one or more pieces of information and may selectively include various types of display devices.

The notification unit 130' may generate a "preparation complete signal" when the mobile device 100 is in the coupling display unit 200, e.g., if the mobile device 100 is in the disposition region 210 and is prepared to perform stable communications, e.g., if it is completely prepared to transfer one or more pieces of information from the mobile device 100 to the coupling display unit 200. The notification unit 130' may notify the user of a preparation complete fact using the preparation complete signal. For example, the notification unit 130' may generate vibration or sound.

In one embodiment, the notification unit 130' may transfer the "preparation complete signal" to other parts or systems of a vehicle, for example, steering wheel electronics. The steering wheel electronics may receive the "preparation complete signal" and generate vibration, sound, light, or another form of alarm or notification signal. Accordingly, preparation complete may be easily notified to a user, in particular, a driver.

In one embodiment, the coupling display unit 200 may include a notification unit. If the mobile device 100 is in the disposition region 210 and prepared to perform stable communication, the user may given a preparation complete notification. For example, the coupling display unit 200 may generate vibration, sound, or other notification signal or alarm.

In one embodiment, when the coupling display unit 200 includes the notification unit and the mobile device 100 is in the coupling display unit 200 (e.g., if the mobile device 100 is in the coupling display unit 200 and completely prepared to perform stable communications), the notification unit may transfer such information to the steering wheel electronics to notify the user of the information. The steering wheel electronics may receive the information and then generate vibration, sound, or light.

Figure 3A:
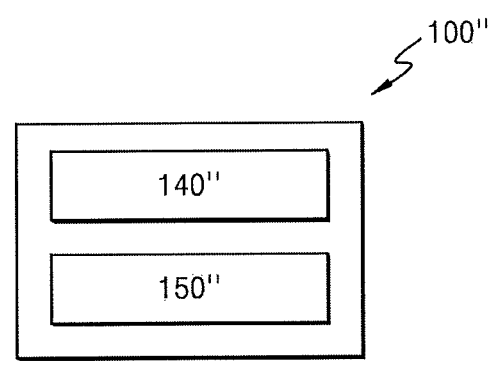
FIG. 3A illustrates another embodiment of a mobile device.

FIG. 3A illustrates another embodiment of a mobile device 100" of the display control system 1000 of FIG. 1. Referring to FIG. 3A, the mobile device 100" may include a camera unit 140" and a control processing unit 150". The camera unit 140" may include a camera to capture, for example, a photo or moving image. The camera unit 140" may include a plurality of cameras, for example, in front and rear sides of the mobile device 100". The cameras may capture, for example, front and rear view of a vehicle when the mobile device 100" is in the disposition region 210.

The control processing unit 150" may extract or process information using the photo or moving image captured by the camera unit 140". The control processing unit 150" may transfer the extracted or processed information to the coupling display unit 200. The display unit 250 of the coupling display unit 200 may display the information.

In one embodiment, the coupling display unit 200 may include a control processing unit and may receive information regarding the photo or moving image captured by the camera unit 140". The control processing unit may control the display unit 250 to display the information. In another example, the control processing unit of the coupling display unit 200 may receive the information regarding the photo or moving image captured by the camera unit 140", may process the information, and obtain new information from the processed information.

Figure 3B:
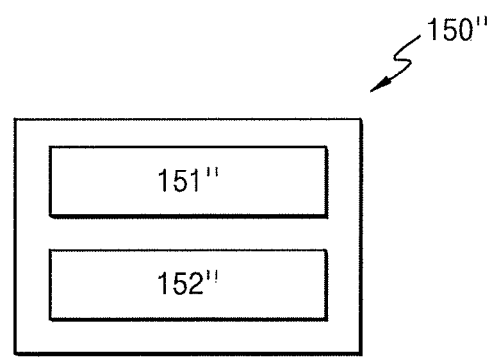
FIG. 3B illustrates an embodiment of a control processing unit of the mobile device.

FIG. 3B illustrates an embodiment of the control processing unit 150" of the mobile device 100" of FIG. 3A. Referring to FIG. 3B, the control processing unit 150" may include an environment recognition unit 151" and an image conversion unit 152". The environment recognition unit 151" may use an image captured by the camera unit 140" to recognize a surrounding environment, for example, a surrounding environment of a vehicle being driven. Examples of the surrounding environment include a lane marking, a central broken line, other surrounding vehicles, etc.

The image conversion unit 152" may use information recognized by the environment recognition unit 151" to convert the image captured by the camera unit 140" to one or more conversion images suitable for a user.

In one embodiment, the coupling display unit 200 may include an environment recognition unit and an image conversion unit. In this regard, the environment recognition unit of the coupling display unit 200 may use the image captured by the camera unit 140" to recognize a surrounding environment, for example, a surrounding environment of a vehicle being driven such as a lane marking, a center lane, other surrounding vehicles, etc.

The image conversion unit of the coupling display unit 200 may use information recognized by the environment recognition unit to convert the image captured by the camera unit 140" into one or more conversion images suitable for the user.

Figure 3C:
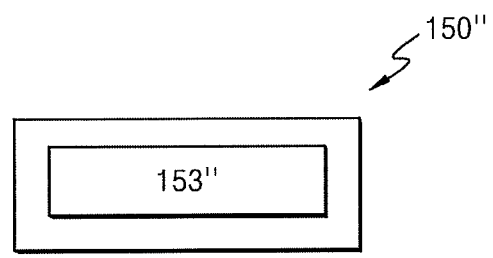
FIG. 3C illustrates another embodiment of a control processing unit.

FIG. 3C illustrates another embodiment of the control processing unit 150" of FIG. 3B. Referring to FIG. 3C, the control processing unit 150" may include an image transfer control unit 153". In one embodiment, the image transfer control unit 153" may be included in the control processing unit 150" of FIG. 3B.

The image transfer control unit 153" may control a process of transferring an image converted by an image conversion unit so that a user may confirm the image. In this regard, the image transfer control unit 153" may transfer the converted image to a display device (e.g., a heads-up display device, a transparent display device, screen, etc.) which the user may easily view while driving.

In one embodiment, the coupling display unit 200 may include an image transfer control unit that transfers the image converted by an image conversion unit to a display (e.g., a head up display, a transparent display, screen, etc.), which the user may easily view while driving.

Figure 3D:
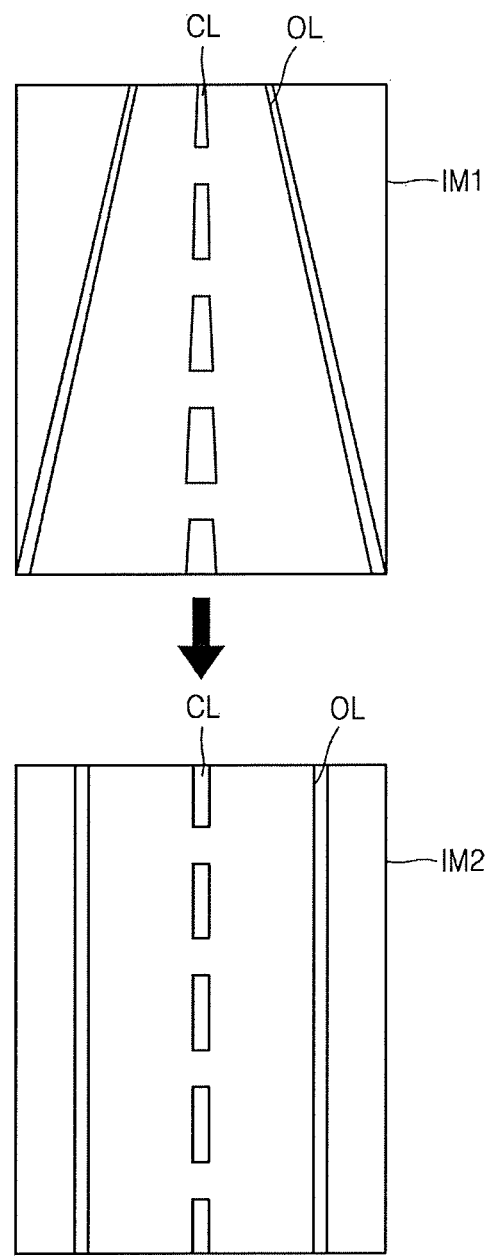
FIG. 3D illustrates an example relating to the embodiment of FIG. 3C.

FIG. 3D illustrates an example for describing the embodiment of FIG. 3C. Referring to FIG. 3D, a base image IM1 is obtained by recognizing surroundings using the environment recognition unit 151" based on an image captured by the camera unit 140". A conversion image IM2 is converted from the base image IM1 using the image conversion unit 152". An outer lane marking OL and a center broken line CL of the base image IM1 may provided as a 3D representation. The conversion image IM2 may have a plane image form. The conversion image IM2 may be transferred to a display that may be recognized by a user through an image transfer control unit as described above.

The user may convert and confirm surrounding information while driving into a planar image for user convenience, for example, to be more easily seen than actual surroundings. This is merely an example, and a surrounding image may be converted to a conversion image of another form.

Figure 4:
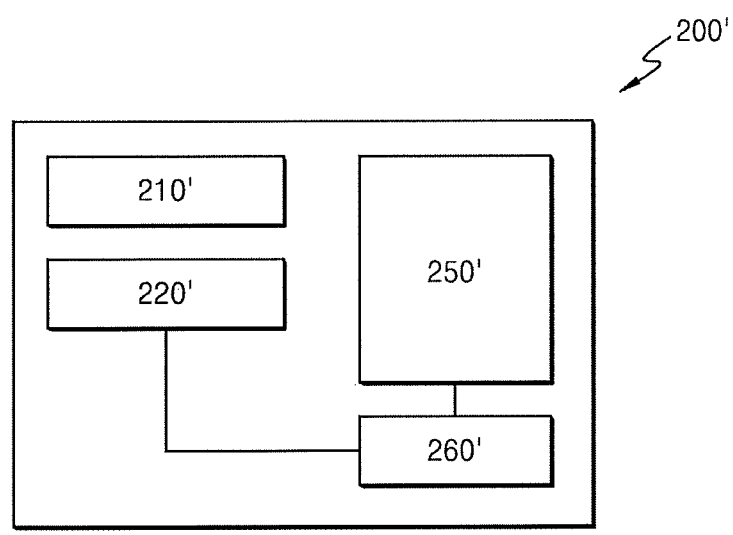
FIG. 4 illustrates an embodiment of a coupling display unit.

FIG. 4 illustrates an embodiment of a coupling display unit 200' of the display control system 1000 of FIG. 1. The coupling display unit 200' may include a disposition region 210', a communication unit 220', a display unit 250', and a coupling display control unit 260'.

The disposition region 210' may be where the mobile device 100 is disposed. In one embodiment, when the mobile device 100 is in the disposition region 210', the disposition region 210' may include a holding member for stably holding the mobile device 100. For example, the mobile device 100 may be in the disposition region 210', and the mobile device 100 may only be separated from the disposition region 210' when a user applies force greater than a certain magnitude.

When the mobile device 100 is in the disposition region 210', the communication unit 220' may communicate with the mobile device 100. The communication unit 220' may include, for example, a contact terminal contacting and communicating with the mobile device 100. In one embodiment, the communication unit 220' may include a non-contact type communication unit, which, for example, may be an NFC communication unit or a Bluetooth connection unit. In one embodiment, the communication unit 220' may be in the disposition region 210'. In another embodiment, the communication unit 220' may be adjacent to the disposition region 210'.

When the mobile device 100 is in the disposition region 210', the display unit 250' may receive one or more pieces of information from the mobile device 100 in the disposition region 210' to display an information region related to mobile device 100.

In one embodiment, the display unit 250' may display received information of the mobile device 100, for example, information indicative of a received phone call or whether a text message has been received for display. In one embodiment, the display unit 250' may display information stored in the mobile device 100, for example, a photo or an image.

When the mobile device 100 displays information, the coupling display control unit 260' may allow the display unit 250' to display the information displayed by the mobile device 100. For example, the coupling display control unit 260' may allow the display unit 250' to be coupled with at least a display function implementation unit of the mobile device 100 based on the information received from the mobile device 100.

The display unit 250' may include one or more display devices emitting visible rays to display the information region. For example, the display unit 250' may include an organic light-emitting device, a liquid crystal device, or another type of display device.

Figure 5:
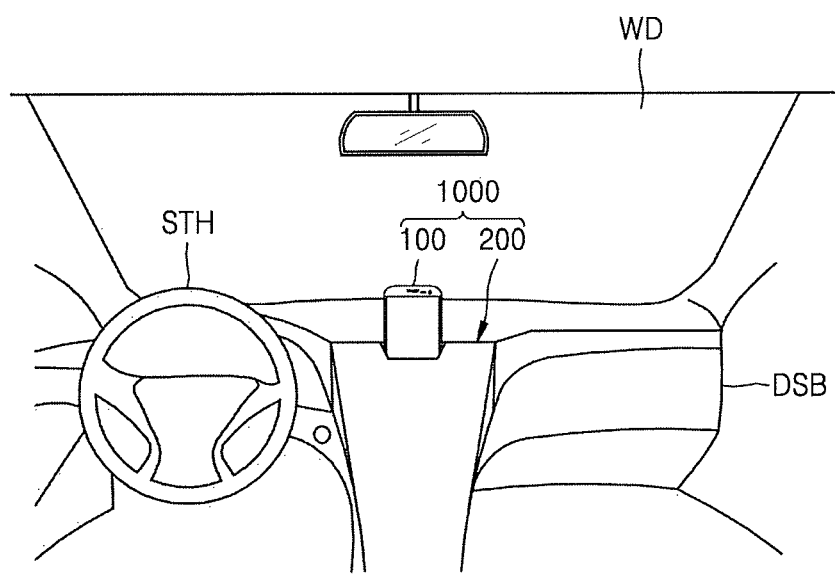
FIG. 5 illustrates another embodiment of a display control system.
Figure 6:
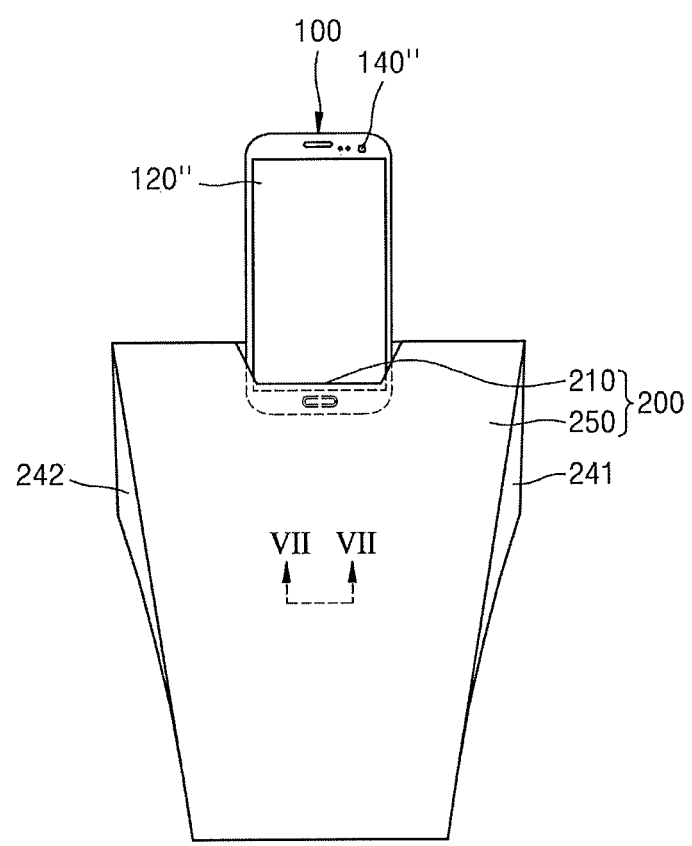
FIG. 6 illustrates another embodiment of a coupling display unit.
Figure 7:
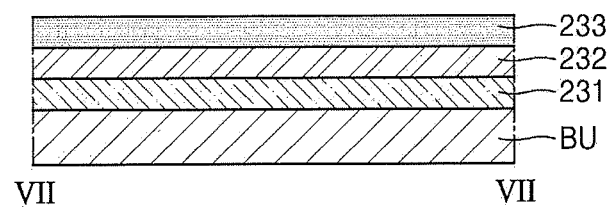
FIG. 7 illustrates a view taken along section line VII-VII in FIG. 6.

FIG. 5 illustrates another embodiment of a display control system 1000. FIG. 6 illustrates an embodiment of the coupling display unit 200 of FIG. 5. FIG. 7 illustrates a view taken along section line VII-VII in FIG. 6.

Referring to FIGS. 5 and 6, the display control system 1000 may include the coupling display unit 200 coupled with the mobile device 100 in a vehicle. A dash board DSB corresponding to a driver seat and a passenger seat may be inside the vehicle. A steering wheel STH may be associated with the driver seat, and a windshield WD may face the front of the vehicle.

The coupling display unit 200 may be inside the vehicle and, for example, may be disposed between the driver seat and the passenger seat inside the vehicle. In one embodiment, the coupling display unit 200 may be in a region of the dash board DSB between the driver seat and the passenger seat.

In one embodiment, the coupling display unit 200 may be connected to one region of the dash board DSB inside the vehicle. In one embodiment, the coupling display unit 200 may extend from an outer surface of one region of the dash board DSB inside the vehicle. In one embodiment, the coupling display unit 200 may be integrally formed with the dash board DSB inside the vehicle.

The mobile device 100 may be the same as a mobile device mentioned in the above-described embodiments. In one example, the mobile device 100 may include the display unit 120' and the camera unit 140".

The mobile device 100 may be selectively disposed in the disposition region 210 of the coupling display unit 200. For example, the display control system 1000 of the present embodiment may only include the coupling display unit 200 from which the mobile device 100 is removed.

A case where the display control system 1000 includes the mobile device 100 and the coupling display unit 200, e.g., a case where the mobile device 100 is not omitted and is disposed in the coupling display unit 200, will be described.

The coupling display unit 200 may include the disposition region 210 and the display unit 250. The disposition region 210 may be where the mobile device 100 is disposed. The disposition region 210 may be in an upper end of the coupling display unit 200. For example, the disposition region 210 may be in one region of the coupling display unit 200 farthest away from the bottom of the vehicle.

The disposition region 210 may include a groove to orient the mobile device 100 in a length direction. When the mobile device 100 is in the disposition region 210 as shown in FIG. 6, one region of a lower end may be accommodated in a groove of the disposition region 210 in relation to the length direction of the mobile device 100.

In one embodiment, when the mobile device 100 is in the disposition region 210, the disposition region 210 may include a holding member in the groove of the disposition region 210 for stably holding the mobile device 100. For example, the mobile device 100 may be in the disposition region 210, where the mobile device 100 may only be separated from the disposition region 210 when a user applies force greater than a certain magnitude.

In one embodiment, when the mobile device 100 is in the disposition region 210, the disposition region 210 may include a communication unit that communicates with the mobile device 100 and, for example, a contact terminal contacting and communicating with the mobile device 100. In one example, the disposition region 210 may include a communication unit that performs non-contact type communication with the mobile device 100.

When the mobile device 100 is in the disposition region 210, the display unit 250 may receive one or more pieces of information from the mobile device 100 to display an information region related to the mobile device 100.

The display unit 250 may be adjacent to the disposition region 210 and between the driver and the passenger inside the vehicle. For example, the display unit 250 may have a lengthy extending shape extending in a direction from a roof of the vehicle or the windshield WD to the bottom of the vehicle. In one embodiment, the display portion 250 may be tapered downward along an extension direction, e.g., in a direction toward the bottom of the vehicle.

In addition, the coupling display unit 200 may include a first side surface unit 241 and a second side surface unit 242. The first side surface unit 241 may connect the display unit 250 and one region of the dash board DSB. The second side surface unit 242 may connect the display unit 250 and one region of the dash board DSB.

In one embodiment, the display unit 250 may display received information of the mobile device 100, for example, a received phone call and whether there is a received text message and may display the received text message. In one embodiment, the display unit 250 may display information stored in the mobile device 100, for example, a photo or an image.

When the mobile device 100 displays information, the display unit 250 may display the information displayed by the mobile device 100. For example, the display unit 250 may be coupled with at least a display function implementation unit of the mobile device 100. The display unit 250 may include one or more display devices emitting visible rays to display the information region. For example, the display unit 250 may include an organic light-emitting display device, a liquid crystal device, or another type of display device.

FIG. 7 illustrates an example of an organic light-emitting device in the display unit 250. Referring to FIG. 7, the display unit 250 may include a first electrode 231, a second electrode 232, and an intermediate layer 233.

The first electrode 231 may include one or more conductive materials, e.g., at least one selected from the group consisting of a transparent conductive oxide such as indium tin oxide (ITO), indium zinc oxide (IZO), zinc oxide (ZnO), indium oxide ($In_2O_3$), indium gallium oxide (IGO), and aluminum zinc oxide (AZO). In one embodiment, the first electrode 231 may include metal having a high reflectivity such as silver (Ag). In one embodiment, the first electrode 231 may be patterned and disposed on a base member BU.

The intermediate layer 233 may include an organic emission layer. The organic emission layer may include a low molecular organic material or a polymer molecular material. In one embodiment, the intermediate layer 233 may further include at least one selected from the group consisting of a hole injection layer, a hole transport layer, an electron transport layer, or an electron injection layer.

The second electrode 232 may include one or more conductive materials, e.g., lithium (Li), calcium (Ca), lithium fluoride (LiF), aluminum (Al), magnesium (Mg), or silver (Ag). The second electrode 232 may have a single or multiple-layer structure that includes at least one of the aforementioned materials or an alloy of at least two of the aforementioned materials.

The coupling display unit 200 may include an outer surface of one region of the dash board DSB inside the vehicle. In one embodiment, the coupling display unit 200 may be connected to another region inside the vehicle. For example, the coupling display unit 200 may correspond to an A pillar. In one example, the coupling display unit 200 may be connected to a B pillar or a C pillar. In one example, the coupling display unit 200 may be connected to one region of another part of the vehicle, e.g., a seat, floor, bottom, or another part in or inside of the vehicle.

Figure 8:
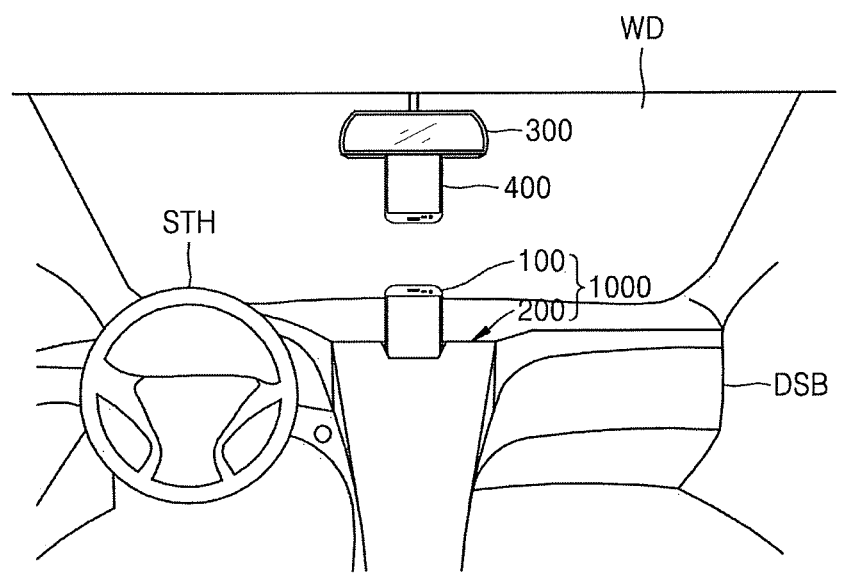
FIG. 8 illustrates another embodiment of a display control system.

FIG. 8 illustrates another embodiment of a display control system which may include the first mobile device 100, the first coupling display unit 200, a second mobile device 400, and a second coupling display unit 300. In this embodiment, the second mobile device 400 and the second coupling display unit 300 are added, compared to the embodiment in FIG. 7.

Referring to FIG. 8, the second coupling display unit 300 may be coupled with the second mobile device 400 in a vehicle. When the second mobile device 400 is in the second coupling display unit 300, the second coupling display unit 300 may receive one or more pieces of information from the second mobile device 400 to display an information region related to the received information.

The second coupling display unit 300 may be inside the vehicle, e.g., may be adjacent a roof of the vehicle. In one embodiment, the second coupling display unit 300 may be in or adjacent to the windshield WD.

In one embodiment, the second coupling display unit 300 may function as a mirror of the vehicle. For example, at least one surface of the second coupling display unit 300 (e.g., a surface facing the rear of the vehicle) may include a reflective surface. The second mobile device 400 is similar to the first mobile device 100 previously discussed. For example, the second mobile device 400 may include a display unit and a camera unit.

The second mobile device 400 may be in a disposition region of the second coupling display unit 300. For example, the present embodiment may include only the second coupling display unit 300 by removing the second mobile device 400.

One region of the second mobile device 400 may be inserted to face a lower portion of the second coupling display unit 300. For example, one region of the second mobile device 400 may be pushed and inserted in a direction from the bottom of the vehicle to the roof of the vehicle.

In one embodiment, the disposition region of the second coupling display unit 300 may be formed to face the bottom of the vehicle such that the second mobile device 400 is disposed. The disposition region of the second coupling display unit 300 may include a support member to support the second mobile device 400, in order to prevent the second mobile device 400 from being separated after the second mobile device 400 is disposed. The second mobile device 400 may be in the disposition region, where the second mobile device 400 may only be separated from the disposition region when a user applies force greater than a certain magnitude.

In one embodiment, when the second mobile device 400 is in the region of the second coupling display unit 300, the disposition region of the second coupling display unit 300 may include a communication unit that may communicate with the second mobile device 400 and, for example, a contact terminal contacting and communicating with the second mobile device 400. In one example, the disposition region of the second coupling display unit 300 may include a communication unit that performs non-contact near distance communications with the second mobile device 400.

When the second mobile device 400 is in the disposition region of the second coupling display unit 300, a display unit of the second coupling display unit 300 may receive one or more pieces of information from the second mobile device 400 in the disposition region to display an information region related to second mobile device 400.

The display unit of the second coupling display unit 300 may be, for example, a region of the second coupling display unit 300 in FIG. 8, e.g., one region of a surface facing the inside the vehicle.

In one embodiment, when the second coupling display unit 300 functions as a mirror of the vehicle, at least one surface of the second coupling display unit 300 (e.g., a surface facing the rear of the vehicle) may include a reflective surface and a display unit.

In one embodiment, the display unit of the second coupling display unit 300 may display received information of the second mobile device 400, for example, a received phone call and whether a text message has been received for display. In one embodiment, the display unit of the second coupling display unit 300 may display information stored in the second mobile device 400, for example, a photo or an image.

In one embodiment, when the second mobile device 400 displays information, the display unit of the second coupling display unit 300 may display the information displayed by the second mobile device 400. For example, the display unit of the second coupling display unit 300 may be coupled with at least a display function implementation unit of the second mobile device 400.

The display unit of the second coupling display unit 300 may include one or more display devices emitting visible rays to display the information region. For example, the display unit of the second coupling display unit 300 may include an organic light-emitting display device, a liquid crystal device, or another type of display device.

In the present embodiment, the first mobile device 100 may be in the first coupling display unit 200 and the second mobile device 400 may be in the second coupling display unit 300. Accordingly, the first coupling display unit 200 and the second coupling display unit 300 may respectively display information regions including information of the first mobile device 100 and the second mobile device 400.

Each of the first mobile device 100 and the second mobile device 400 may include a camera unit and a control processing unit as mentioned in the above-described embodiments. The camera unit of the first mobile device 100 and the camera unit of the second mobile device 400 may face the front of the vehicle and the rear thereof, respectively, in order to obtain images of the front and rear of the vehicle. The images are processed and a new image is displayed from the processed images for safety.

According to one variation, the embodiment of FIG. 8 may include the second mobile device 400 and the second coupling display unit 300 and the first mobile device 100 and the first coupling display unit 200 may be omitted.

Figure 9:
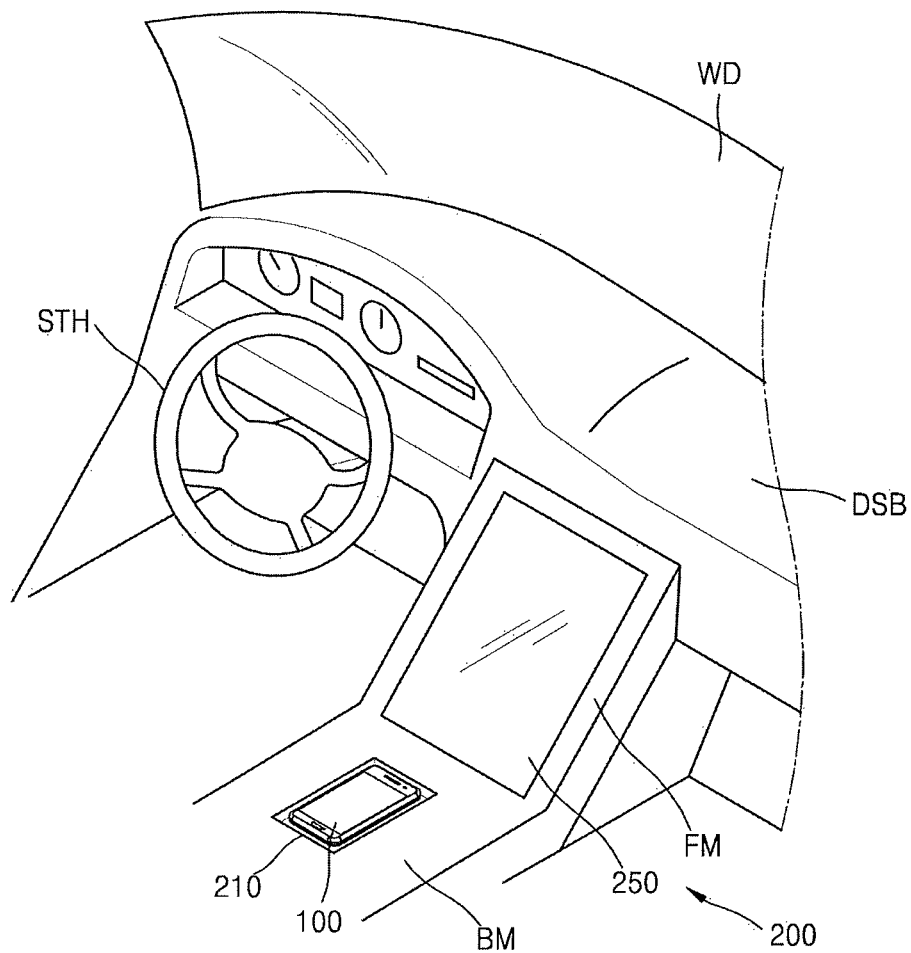
FIG. 9 illustrates another embodiment of a display control system.

FIG. 9 illustrates an embodiment of a display control system which may include the coupling display unit 200 coupled with the mobile device 100 inside a vehicle. The dash board DSB corresponding to a driver seat and a passenger seat may be inside the vehicle. The steering wheel STH may be associated with the driver seat. The windshield WD may face the front of the vehicle.

The coupling display unit 200 may be inside the vehicle and, for example, between the driver seat and the passenger seat inside the vehicle. For example, the coupling display unit 200 may be in a region of the dash board DSB between the driver seat and the passenger seat. In one embodiment, the coupling display unit 200 may include an outer surface of one region of the dash board DSB inside the vehicle. In one embodiment, the coupling display unit 200 may be connected to the dash board DSB inside the vehicle.

The coupling display unit 200 may include a front unit FM and a bottom unit BM. The front unit FM may face the front of the vehicle. The bottom unit BM may be connected to the front unit FM and may be disposed farther away from the front of the vehicle than the front unit FM. In one embodiment, the bottom unit BM may extend to face the bottom of the vehicle from the front unit FM.

The mobile device 100 may be the same as a mobile device mentioned in the above-described embodiments. For example, the mobile device 100 may include the display unit 120' and the camera unit 140". The mobile device 100 may be in the disposition region 210 of the coupling display unit 200. In one embodiment, the display control system 1000 may only include the coupling display unit 200 from which the mobile device 100 is removed.

For convenience of description, a case where the display control system 1000 includes the mobile device 100 and the coupling display unit 200 (e.g., a case where the mobile device 100 is not omitted and is disposed in the coupling display unit 200) will be described.

The coupling display unit 200 may include the disposition region 210 and the display unit 250. The disposition region 210 may be where the mobile device 100 is disposed. The disposition region 210 may be in one region of the bottom unit BM of the coupling display unit 200. The disposition region 210 may include a groove corresponding to or greater than an area of the mobile device 100 to accommodate the mobile device 100. When the mobile device 100 is in the disposition region 210, the display unit of the mobile device 100 may face upward to thereby reduce or prevent the mobile device 100 from being separated from the disposition region 210.

In one embodiment, when the mobile device 100 is in the disposition region 210, the disposition region 210 may include a holding member in the groove of the disposition region 210 for stably holding the mobile device 100. For example, the mobile device 100 may be in the disposition region 210, where the mobile device 100 may only be separated from the disposition region 210 when a user applies force greater than a certain magnitude.

In one embodiment, when the mobile device 100 is in the disposition region 210, the disposition region 210 may include a communication unit that communicates with the mobile device 100 and, for example, a contact terminal for contacting and communicating with the mobile device 100. In one example, the disposition region 210 may include a communication unit that may perform non-contact type communication with the mobile device 100.

When the mobile device 100 is in the disposition region 210, the display unit 250 may receive one or more pieces of information from the mobile device 100 in the disposition region 210' to display an information region related to the mobile device 100. The display unit 250 may be in the front unit FM and may have a lengthy extending shape.

The display unit 250 may be adjacent to the disposition region 210 and may be between the driver and the passenger inside the vehicle. For example, the display unit 250 may have an inclined shape from the viewpoint of the driver seat and passenger seat.

In one embodiment, the display portion 250 may have a uniform width along an extension direction, e.g., in a direction toward the bottom of the vehicle. In one embodiment, the display unit 250 may display received information of the mobile device 100, for example, a received phone call and whether a received text message has been received for display. In one embodiment, the display unit 250 may display information stored in the mobile device 100, for example, a photo or an image.

When the mobile device 100 displays information, the display unit 250 may display the information displayed by the mobile device 100. For example, the display unit 250 may be coupled with at least a display function implementation unit of the mobile device 100.

The display unit 250 may include an input unit recognizing a user manipulation, for example, a touch recognition unit. The display unit 250 may include one or more display devices emitting visible rays in order to display the information region. For example, the display unit 250 may include an organic light-emitting display device, a liquid crystal device, or another type of display device.

Figure 10:
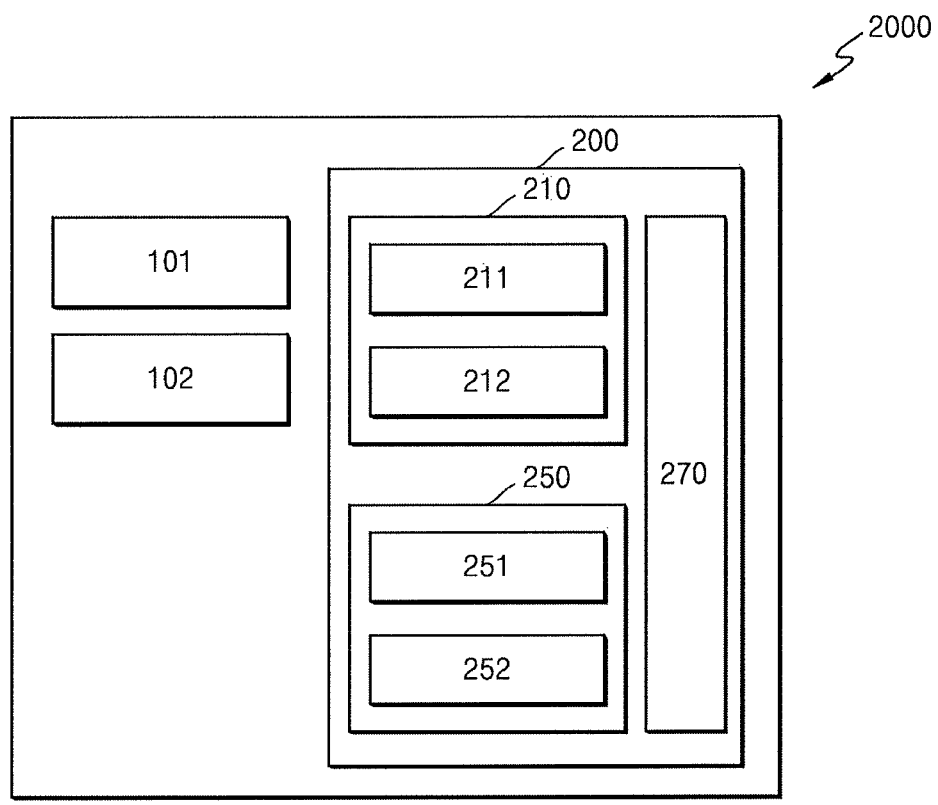
FIG. 10 illustrates another embodiment of a display control system.

FIG. 10 illustrates another embodiment of a display control system 2000 which may include the coupling display unit 200 coupled with a first mobile device 101 and a second mobile device 102 in a vehicle.

The first mobile device 101 and the second mobile device 102 may include various electronic devices that are portable and mobile, e.g., not fixed. For example, the first mobile device 101 and the second mobile device 102 may be cellular phones, PDAs, or tablet PCs. In one embodiment, the first mobile device 101 and the second mobile device 102 may be different types of electronic devices.

The first mobile device 101 and the second mobile device 102 may be respectively disposed in a first disposition region 211 and a second disposition region 212 of the disposition region 210 of the coupling display unit 200. In one embodiment, the display control system 2000 may only include the coupling display unit 200 from which the first mobile device 101 and the second mobile device 102 are removed.

For convenience of description, a case where the display control system 2000 includes the first mobile device 101, the second mobile device 102, and the coupling display unit 200 (e.g., a case where the first mobile device 101 and the second mobile device 102 are not omitted and are disposed in the coupling display unit 200) will be described.

The coupling display unit 200 may include the disposition region 210, the display unit 250, and a display control unit 270. The disposition region 210 may include the first disposition region 211 and the second disposition region 212. The first disposition region 211 and the second disposition region 212 may be respectively disposed to correspond to the first mobile device 101 and the second mobile device 102.

In one embodiment, when the first mobile device 101 and the second mobile device 102 are respectively disposed to correspond to the first disposition region 211 and the second disposition region 212, each of the first disposition region 211 and the second disposition region 212 may include a holding member for stably holding the first mobile device 101 and the second mobile device 102. For example, the first mobile device 101 and the second mobile device 102 may be respectively disposed in the first disposition region 211 and the second disposition region 212, and the first mobile device 101 and the second mobile device 102 may only be separated from the first disposition region 211 and the second disposition region 212 when a user applies force greater than a certain magnitude.

In one embodiment, when the first mobile device 101 and the second mobile device 102 are respectively disposed in the first disposition region 211 and the second disposition region 212, the first disposition region 211 and the second disposition region 212 may include a communication unit to communicate with the first mobile device 101 and the second mobile device 102, and, for example, a contact terminal to contact and communicate with the first mobile device 101 and the second mobile device 102. In another example, the first disposition region 211 and the second disposition region 212 may include a communication unit to perform non-contact near distance communication with the first mobile device 101 and the second mobile device 102.

The display unit 250 may include a first display unit 251 and a second display unit 252. When the first mobile device 101 corresponds to the first disposition region 211, the first display unit 251 may receive one or more pieces of information from the first mobile device 101 to display an information region relating to the first mobile device 101.

In one embodiment, the first display unit 251 may display received information of the first mobile device 101, for example, a received phone call and whether a received text message has been received, and may display the received text message. In one embodiment, the first display unit 251 may display information stored in the first mobile device 101, for example, a photo or an image. In one embodiment, when the first mobile device 101 displays information, the first display unit 251 may display the information displayed by the first mobile device 101. For example, the first display unit 251 may be coupled with at least a display function implementation unit of first mobile device 101.

The first display unit 251 may include one or more display devices emitting visible rays to display the information region. For example, the first display unit 251 may include an organic light-emitting display device, a liquid crystal device, or another type of display device.

When the second mobile device 102 is in the second disposition region 212, the second display unit 252 may receive one or more pieces of information from the second mobile device 102 in the second disposition region 212 to display an information region related to the second mobile device 102.

In one embodiment, the second display unit 252 may display received information of the second mobile device 102, for example, a received phone call and whether a text message has been received, and may display the received text message. In one embodiment, the second display unit 252 may display information stored in the second mobile device 102, for example, a photo or an image.

In one embodiment, when the second mobile device 102 displays information, the second display unit 252 may display the information displayed by the second mobile device 102. For example, the second display unit 252 may be coupled with at least a display function implementation unit of the second mobile device 102.

The second display unit 252 may include one or more display devices implementing visible rays in order to display the information region. For example, the second display unit 252 may include an organic light-emitting display device, a liquid crystal device, or another type of display device.

The display control unit 270 may control the first display unit 251 and the second display unit 252. For example, the display control unit 270 may respectively control sizes of regions displayed by the first display unit 251 and the second display unit 252. In one embodiment, the display control unit 270 may split a region in a display unit to dispose the first display unit 251 in a first region and the second display unit 252 in a second region distinguished from the first region.

In one embodiment, the display control unit 270 may control the size of the first region in which the first display unit 251 is disposed and the size of the second region in which the second display unit 252 is disposed according to circumstances. For example, when the second mobile device 102 is not in the second disposition region 212 and only the first mobile device 101 is in the first disposition region 211, the display control unit 270 may increase the size of the first region, in which the first display unit 251 is disposed, to be greater than the size of the second region. In one embodiment, the display control unit 270 may convert the entire display unit 250 to the first region, e.g., convert the entire display unit 250 to implement a function of the first display unit 251.

In one embodiment, when the first mobile device 101 is not in the first disposition region 211 and only the second mobile device 102 is in the second disposition region 212, the display control unit 270 may increase the size of the second region, in which the second display unit 252 is disposed, to be greater than the size of the first region. In one embodiment, the display control unit 270 may convert the entire display unit 250 to the second region, e.g., convert the entire display unit 250 to implement a function of the second display unit 252.

The display control system 2000 of the present embodiment may include the coupling display unit 200 coupled with the first mobile device 101 and the second mobile device 102. When the first mobile device 101 and the second mobile device 102 are in the first and second disposition regions 211 and 212 of the coupling display unit 200, the first display unit 251 and the second display unit 252 may retrieve one or more pieces of information from the first mobile device 101 and the second mobile device 102 and display information regions including the one or more pieces of information.

Accordingly, a user may confirm information of the first mobile device 101 and the second mobile device 102 using the first display unit 251 and the second display unit 252 of the coupling display unit 200 without having to confirm information on the first mobile device 101 and the second mobile device 102, thereby improving user convenience.

The first mobile device 101 and the second mobile device 102 may be separately disposed in the first disposition region 211 and the second disposition region 212, respectively. Thus a plurality of users inside the vehicle, for example, a mobile device (e.g. first mobile device 101) of a driver and a mobile device (e.g. second mobile device 102) of a user in a passenger seat may display information using the first display unit 251 and the second display unit 252, respectively. The display control unit 270 may therefore be used to improve convenience of multiple users in a vehicle, and efficiency of the display control system 2000 may be improved. In one embodiment, three or more display units may be coupled with three or more mobile devices.

Figure 11:
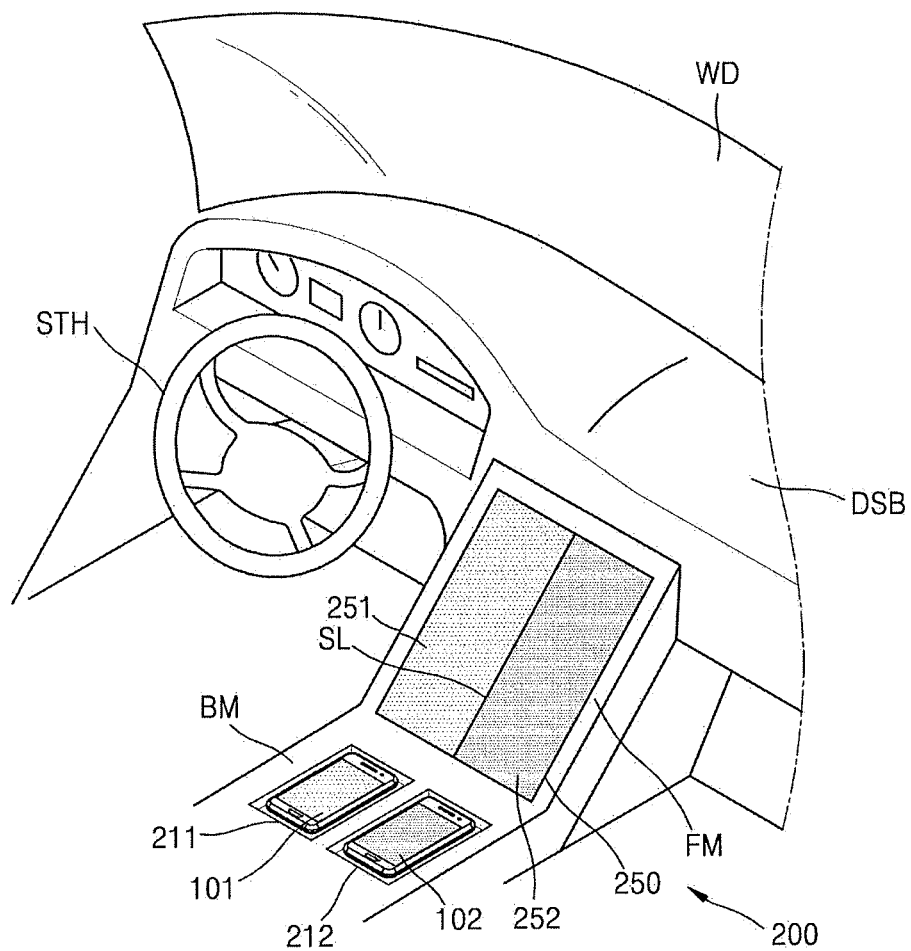
FIG. 11 illustrates another embodiment of a display control system.

FIG. 11 illustrates another embodiment of a display control system which may include the coupling display unit 200 coupled with the first mobile device 101 and the second mobile device 102 in a vehicle. The dash board DSB corresponding to a driver seat and a passenger seat is inside the vehicle. The steering wheel STH is associated with the driver seat and the windshield WD faces the front of the vehicle.

The coupling display unit 200 may be inside the vehicle, for example, between the driver seat and the passenger seat. The coupling display unit 200 may be in a region of the dash board DSB between the driver seat and the passenger seat. In one embodiment, the coupling display unit 200 may include an outer surface of one region of the dash board DSB. In one embodiment, the coupling display unit 200 may be connected to the dash board DSB.

The coupling display unit 200 may include the front unit FM and the bottom unit BM. The front unit FM may face the front of the vehicle. The bottom unit BM may be connected to the front unit FM and may be farther away from the front of the vehicle than the front unit FM. In one embodiment, the bottom unit BM may extend to face the bottom of the vehicle from the front unit FM. The first mobile device 101 and the second mobile device 102 may be the same as described with reference to FIG. 10.

The first mobile device 101 and the second mobile device 102 may be selectively disposed in the first disposition region 211 and the second disposition region 212 of the coupling display unit 200, respectively. In one embodiment, the display control system 1000 of the present embodiment may only include the coupling display unit 200 from which the first mobile device 101 and the second mobile device 102 are removed. For convenience of description, a case where the display control system 1000 includes the first mobile device 101 and the second mobile device 102 and the coupling display unit 200, e.g., a case where the first mobile device 101 and the second mobile device 102 are not omitted and is disposed in the coupling display unit 200, will be described.

The coupling display unit 200 may include the disposition region 210, the display unit 250, and a display control unit. The disposition region 210 may be where the first mobile device 101 and the second mobile device 102 are disposed. The first disposition region 211 and the second disposition region 212 of the disposition region 210 may be in one region of the bottom unit BM of the coupling display unit 200.

The first disposition region 211 and the second disposition region 212 may include grooves having sizes that correspond to or are greater than areas of the first mobile device 101 and the second mobile device 102, where the first mobile device 101 and the second mobile device 102 are to be laid. Accordingly, when the first mobile device 101 and the second mobile device 102 are in the first disposition region 211 and the second disposition region 212, respectively, the display units of the first mobile device 101 and the second mobile device 102 may conveniently face upward. The grooves may also reduce or prevent the first mobile device 101 and the second mobile device 102 from being separated from the first disposition region 211 and the second disposition region 212, respectively.

In one embodiment, when the first mobile device 101 and the second mobile device 102 are in the first disposition region 211 and the second disposition region 212, respectively, the first disposition region 211 and the second disposition region 212 may include holding members in the grooves of the first disposition region 211 and the second disposition region 212 for stably holding the first mobile device 101 and the second mobile device 102. For example, the first mobile device 101 and the second mobile device 102 may be in the first disposition region 211 and the second disposition region 212, respectively, where the first mobile device 101 and the second mobile device 102 may only be separated from the first disposition region 211 and the second disposition region 212, respectively, when a user applies force greater than a certain magnitude.

In one embodiment, when the first mobile device 101 and the second mobile device 102 are in the first disposition region 211 and the second disposition region 212, respectively, the first disposition region 211 and the second disposition region 212 may include communication units to communicate with the first mobile device 101 and the second mobile device 102 and, for example, contact terminals to contact and communicate with the first mobile device 101 and the second mobile device 102.

In another example, the first disposition region 211 and the second disposition region 212 may include communication units to perform non-contact type communication with the first mobile device 101 and the second mobile device 102.

The display unit 250 may include the first display unit 251 and the second display unit 252. The display unit 250 may be in the front unit FM. The display unit 250 may have a lengthy extending shape. The display unit 250 may be adjacent to the disposition region 210 and between the driver and the passenger inside the vehicle. The display unit 250 may have, for example, an inclined shape as seen from the driver seat and the passenger seat. In one embodiment, the display portion 250 may have a uniform width along an extension direction, e.g., in a direction toward the bottom of the vehicle.

The first display unit 251 and the second display unit 252 of the display unit 250 may be at respective sides in the display unit 250 in relation to a boundary line SL. The first display unit 251 may correspond to the first disposition region 211, and the second display unit 252 may correspond to the second disposition region 212. The first display unit 251 and the second display unit 252 may be, for example, the same as the first display unit 251 and the second display unit 252 in FIG. 10.

In one embodiment, the first display unit 251 and the second display unit 252 of the present embodiment may include input units to recognize a user manipulation, for example, touch recognition units. The display unit 250 may include one or more display devices emitting visible rays to display an information region. For example, the display unit 250 may include an organic light-emitting display device, a liquid crystal device, or another type of display device. The present embodiment may be an example implementing the embodiment of FIG. 10.

Figure 12:
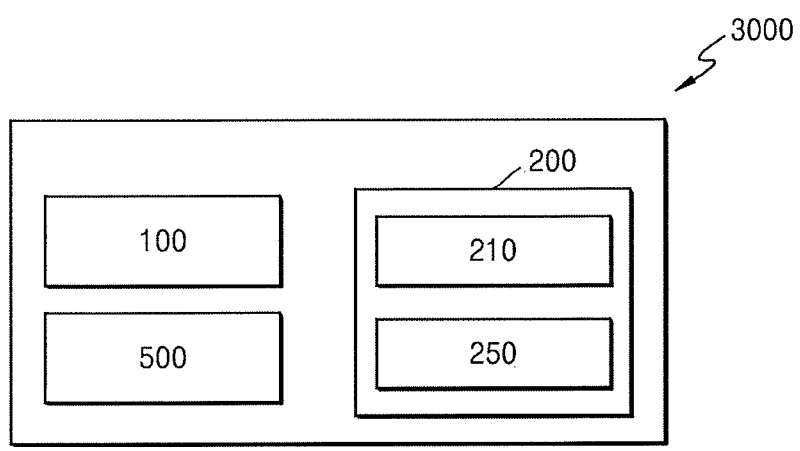
FIG. 12 illustrates another embodiment of a display control system.

FIG. 12 illustrates an embodiment of a display control system 3000 which may include the coupling display unit 200 coupled with the mobile device 100 in a vehicle and a position information receiving unit 500.

The position information receiving unit 500 may receive information relating to the position of the vehicle (e.g., where the coupling display unit 200 is disposed) while the vehicle is being driven. For example, the position information receiving unit 200 may include a global positioning system (GPS). In one embodiment, the position information receiving unit 500 may receive position information from the mobile device 100" or a device other than the display control system 3000.

The display unit 250 of the coupling display unit 200 may display information received by the position information receiving unit 500. In one embodiment, the display unit 250 may process information received by the position information receiving unit 500 and display information for improving convenience of user driving.

In one embodiment, when the mobile device 100 is in the disposition region 210, the display unit 250 may receive one or more pieces of information from the mobile device 100 in the disposition region 210 and display an information region related to the mobile device 100. In this regard, the display unit 250 may also display information received by the position information receiving unit 500.

In one embodiment, the display unit 250 may combine and process information received by the position information receiving unit 500 and information from the mobile device 100 and display the information for improving convenience of the user while driving. The display control system 3000 of the present embodiment may include the coupling display unit 200 coupled with the mobile device 100. The display control system 3000 may include the position information receiving unit 500 to receive position information of the vehicle that is being driven. Accordingly, the position information may be used as a basis for displaying various types of information through the display unit 250.

Figure 13:
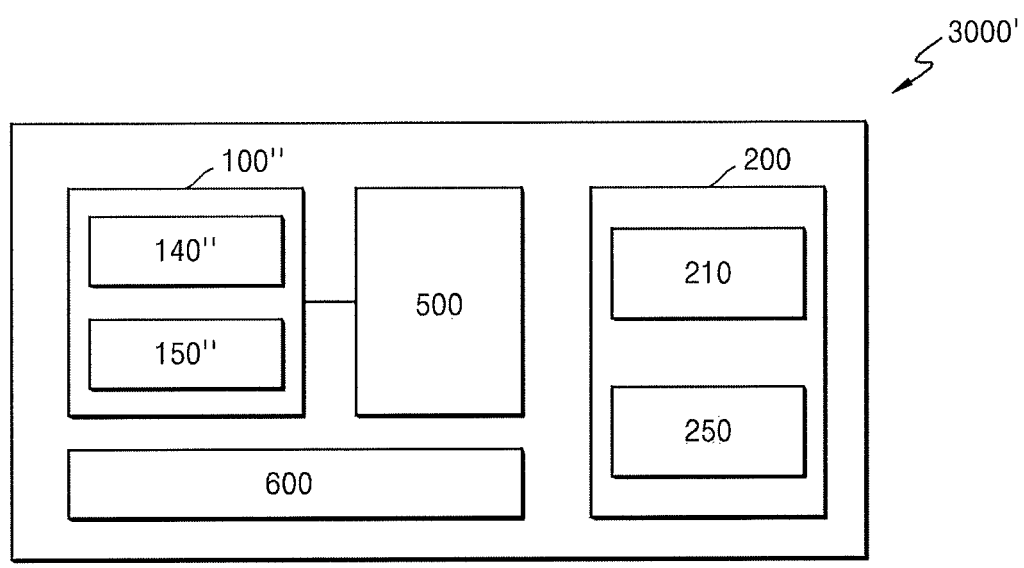
FIG. 13 illustrates another embodiment of a display control system.

FIG. 13 illustrates an embodiment of a display control system 3000' which may include the coupling display unit 200 coupled with the mobile device 100" in a vehicle, the position information receiving unit 500, and a notification unit 600.

The mobile device 100" may be in the disposition region 210 of the coupling display unit 200. In one embodiment, the display control system 3000" may only include the coupling display unit 200 from which the mobile device 100" is removed. Also, the mobile device 100" may include camera unit 140" and the control processing unit 150". The camera unit 140" and the control processing unit 150" may be the same as the embodiment in FIG. 3A. The position information receiving unit 500 may be the same as the embodiment in FIG. 12.

When the mobile device 100" is in the coupling display unit 200 (e.g., where the mobile device 100" is disposed in the disposition region 210) and completely prepared to perform stable communications, the notification unit 600 may notify a user of communication preparation complete information. For example, the notification unit 600 may generate vibration, sound, light, or another type of alarm or notification signal.

In one embodiment, when the notification unit 600 notifies the user of the communication preparation complete information, the notification unit 600 may transfer the communication preparation complete information to electronics of a steering wheel, so that the user while driving knows of the communication preparation complete information. The steering wheel electronics may receive the communication preparation complete information and generate vibration, sound, light, or another type of alarm or notification signal. The notification unit 600 may be one component and may be omitted in some embodiments.

In the present embodiment, the camera unit 140" may capture an image of the front of the vehicle while driving or outside. The control processing unit 150" may use a captured image to extract or process information.

The control processing unit 150" may receive position information from the position information receiving unit 500. The control processing unit 150" may use vehicle surrounding image information from the camera unit 140" and vehicle position information from the position information receiving unit 500 to generate "position related vehicle driving information". For example, the position related vehicle driving information may be driving related general information, e.g., driving path information, hazard information, etc., for vehicle driving. The position related vehicle driving information may be real time information that changes according to vehicle driving. The display unit 250 may display the position related vehicle driving information generated by the control processing unit 150".

In one embodiment, the control processing unit 150" may be in the coupling display unit 200 instead of the mobile device 100". In another example, the control processing unit 150" may be in the mobile device 100" and the coupling display unit 200. The one embodiment may be applied to the control processing unit 150" of the above-described embodiment.

The display control system 3000' of the present embodiment may include the coupling display unit 200 coupled with the mobile device 100". The display control system 3000' of the present embodiment may also include the position information receiving unit 500 to receive position information of the vehicle while driving. Accordingly, the position information may be used to display various types of information through the display unit 250.

The camera unit 140" of the mobile device 100" may capture an image of the front of the vehicle while driving or the outside. The control processing unit 150" may use a captured image to extract or process information. For example, the control processing unit 150" may use vehicle surrounding image information from the camera unit 140" and vehicle position information from the position information receiving unit 500 to generate position related vehicle driving information.

The display unit 250 may display driving related information such as the position related vehicle driving information generated by the control processing unit 150', and may display information to the user in real time, thereby displaying information for improving convenience while driving.

The display control system 3000' of the present embodiment may include the coupling display unit 200 coupled with the mobile device 100. The display control system 3000' may also include the position information receiving unit 500 receiving position information of the vehicle while driving. The display control system 3000' may use position related vehicle driving information generated by a control processing unit, thereby improving user convenience. In one embodiment, the display control system 3000' may display various types of information including the position related vehicle driving information through the display unit 250 to obtain various types of information while driving, thereby improving vehicle driving safety and driving convenience.

The controllers, processors, units, and other processing features of the disclosed embodiments may be implemented in logic which, for example, may include hardware, software, or both. When implemented at least partially in hardware, the controllers, processors, unit, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, units, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the embodiments set forth in the claims.

What is claimed is:

1. A display control system, comprising:
    a coupling display unit to communicate with a mobile device in a vehicle, wherein the coupling display unit includes:
        a disposition region to receive the mobile device at a predetermined location in the vehicle; and
        a display to receive information from the mobile device and to display an information region corresponding to the mobile device, wherein
    when the mobile device is in the disposition region, a display of the mobile device and the display of the coupling display unit are arranged along a direction such that both are viewable,
    the disposition region includes a holding member disposed in a groove for the mobile device,
    the holding member holds the mobile device and the groove orients the mobile device in a length direction, and
    the display is adjacent to the groove of the disposition region.

2. The system as claimed in claim 1, wherein the disposition region includes a communication circuit to communicate with the mobile device when the mobile device is in the disposition region.

3. The system as claimed in claim 1, wherein the coupling display unit includes a controller to control the display to display information displayed by the mobile device when the mobile device is in the disposition region.

4. The system as claimed in claim 1, wherein the coupling display unit includes a notification circuit to generate a preparation complete signal when the mobile device is in the disposition region and is completely prepared to transfer information from the mobile device to the coupling display unit.

5. The system as claimed in claim 4, wherein:
    the notification circuit is to transfer the preparation complete signal to steering wheel electronics of the vehicle, and
    the steering wheel electronics is to generate a notification signal based on the preparation complete signal from the notification circuit.

6. The system as claimed in claim 1, wherein:
    the coupling display unit includes a control processor to receive information corresponding to an image captured by a camera of the mobile device, and
    the control processor is to display the information from the mobile device on the display, process the information from the mobile device, or obtain new information based on the information received from the mobile device.

7. The system as claimed in claim 6, wherein the control processor includes:
    an environment recognizer to receive an image of an environment outside of the vehicle as captured by a camera of the mobile device and to recognize a surrounding environment of the vehicle based on the received image, and
    an image converter to perform the operation of converting the image captured by the camera based on information of the environment recognizer to a conversion image.

8. The system as claimed in claim 1, wherein the display includes one or more display devices.

9. The system as claimed in claim 1, wherein the coupling display unit is connected to at least one part in the vehicle.

10. The system as claimed in claim 1, wherein the coupling display unit is disposed to correspond to a space between a driver seat and a passenger seat of the vehicle.

11. The system as claimed in claim 1, wherein the disposition region includes a groove for the mobile device.

12. The system as claimed in claim 1, wherein the display has a shape extending along a direction from a roof or a windshield to a bottom of the vehicle.

13. The system as claimed in claim 12, wherein the disposition region is in one region of the coupling display unit corresponding to the predetermined location, the one region spaced from the bottom of the vehicle.

14. The system as claimed in claim 12, wherein the coupling display unit includes:
a first side surface section, and
a second side surface section,
wherein the display is between the first and second side surface sections, and wherein the first side surface section is to connect the display to one region of a dash board of the vehicle and the second side surface section is to connect the display to one region of the dash board of the vehicle.

15. The system as claimed in claim 1, wherein:
the coupling display unit is adjacent to a roof or a windshield of the vehicle, and
the disposition region is toward a bottom of the vehicle that corresponds to the predetermined location.

16. The system as claimed in claim 15, wherein the coupling display unit includes one or more reflective surfaces to serve as a rearview mirror of the vehicle.

17. The system as claimed in claim 1, wherein:
the coupling display unit includes a front section towards a front of the vehicle and a bottom section farther away from a front of the vehicle than the front section and closer to a bottom of the vehicle,
the disposition region is in the bottom section, and
the display is in the front section.

18. The system as claimed in claim 1, wherein:
the coupling display unit includes a plurality of disposition regions including a plurality of respective mobile devices and a plurality of displays, and
when the mobile devices are in the disposition regions, the coupling display unit is to receive information from each of the mobile devices and is to display information regions related to the mobile devices.

19. The system as claimed in claim 18, wherein the coupling display unit includes a display controller to control a size of a display region of each of the displays.

20. The system as claimed in claim 1, wherein the coupling display unit includes:
a position information receiver to receive information related to a position of the vehicle; and
a control processor to generate position-related vehicle driving information when the mobile device is in the disposition region, the position-related vehicle driving information including position information corresponding to the vehicle while being driven, the control processor to generate the position-related vehicle driving information based on information regarding an image captured by a camera of the mobile device and the information received by the position information receiver, the display to display the position-related vehicle driving information generated by the control processor.

* * * * *